United States Patent
Altaf et al.

(10) Patent No.: US 11,061,979 B2
(45) Date of Patent: Jul. 13, 2021

(54) WEBSITE DOMAIN SPECIFIC SEARCH

(71) Applicant: INTERNATIONAL BUSINESS MACHINES CORPORATION, Armonk, NY (US)

(72) Inventors: Faheem Altaf, Pflugerville, TX (US); Lisa Seacat DeLuca, Baltimore, MD (US); Raghuram Srinivas, McKinney, TX (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 16/574,390

(22) Filed: Sep. 18, 2019

(65) Prior Publication Data

US 2020/0012700 A1    Jan. 9, 2020

Related U.S. Application Data

(63) Continuation of application No. 15/398,789, filed on Jan. 5, 2017, now abandoned.

(51) Int. Cl.
   *G06F 16/9535* (2019.01)
(52) U.S. Cl.
   CPC ............................. *G06F 16/9535* (2019.01)
(58) Field of Classification Search
   CPC ................................................ G06F 16/9535
   See application file for complete search history.

(56) References Cited

U.S. PATENT DOCUMENTS

| | | |
|---|---|---|
| 6,728,706 B2 | 4/2004 | Aggarwal |
| 7,082,426 B2 | 7/2006 | Musgrove et al. |
| 7,219,099 B2 | 5/2007 | Kuntala et al. |
| 7,908,166 B2 | 3/2011 | Keil et al. |
| 8,156,073 B1 | 4/2012 | Dave |
| 8,589,399 B1 | 11/2013 | Lee |
| 9,311,372 B2 | 4/2016 | Garera et al. |
| 9,569,700 B1 | 2/2017 | Santos |
| 2001/0044795 A1 | 11/2001 | Cohen |
| 2003/0037034 A1 | 2/2003 | Daniels |
| 2003/0195793 A1 | 10/2003 | Jain |
| 2004/0015415 A1 | 1/2004 | Cofino |
| 2004/0205044 A1 | 10/2004 | Su |
| 2005/0055357 A1 | 3/2005 | Campbell |
| 2008/0097822 A1 | 4/2008 | Schigel |

(Continued)

FOREIGN PATENT DOCUMENTS

WO    2013009613    1/2013

OTHER PUBLICATIONS

Friedman, Mark J.; List of IBM Patents or Patent Applications Treated as Related; Sep. 18, 2019; 1 page.

(Continued)

*Primary Examiner* — Jay A Morrison
(74) *Attorney, Agent, or Firm* — Schmeiser, Olsen & Watts; Stephanie Carusillo

(57) ABSTRACT

A method and system for improving a domain specific search is provided. The method includes executing a user initiated search query and analyzing associated. In response, a search results data set is generated and associated hardware sensor devices detect how a user interacts with specific search facets of the search results data set. The search results data set is refined and attributes of the specific search facets are determined. Unstructured data associated with items described within the search results data set is updated.

19 Claims, 6 Drawing Sheets

(56) References Cited

U.S. PATENT DOCUMENTS

| | | |
|---|---|---|
| 2009/0150141 A1 | 6/2009 | Wible |
| 2010/0121631 A1 | 5/2010 | Bonnet |
| 2012/0143883 A1 | 6/2012 | Chen |
| 2013/0013616 A1 | 1/2013 | Leidner |
| 2015/0378975 A1 | 12/2015 | Wu |
| 2016/0203217 A1 | 7/2016 | Anisingaraju |
| 2016/0292705 A1 | 10/2016 | Ayzenshtat |
| 2016/0379289 A1 | 12/2016 | More |
| 2017/0124619 A1 | 5/2017 | Abhishek |
| 2017/0177710 A1 | 6/2017 | Burlik |
| 2017/0178037 A1 | 6/2017 | Kaye |
| 2017/0221120 A1 | 8/2017 | Pathak |
| 2018/0189403 A1 | 7/2018 | Altaf |
| 2018/0210957 A1 | 7/2018 | Altaf |
| 2019/0213277 A1 | 7/2019 | Deluca |

OTHER PUBLICATIONS

Unstructured (definition); Merriam-Webster online dictionary webpage; https://www.merriam-webster.com/dictionary/unstructured; retrieved Sep. 13, 2018; 13 pages.

WEBSITE DOMAIN SPECIFIC SEARCH

CROSS REFERENCE TO RELATED APPLICATIONS

This application is a continuation application claiming priority to Ser. No. 15/398,789 filed Jan. 5, 2017, the contents of which are hereby incorporated by reference.

FIELD

The present invention relates generally to a method for implementing a domain specific search query and in particular to a method and associated system for improving search query technology by determining how a user interacts with specific search facets of Web based search results and updating unstructured results of the Web based search results.

BACKGROUND

Accurately executing a search comprising multiple attributes typically includes an inaccurate process with little flexibility. Analyzing multiple attributes with respect to search results may include a complicated process that may be time consuming and require a large amount of resources. Accordingly, there exists a need in the art to overcome at least some of the deficiencies and limitations described herein above.

SUMMARY

A first aspect of the invention provides domain specific search improvement method comprising: executing, by a processor of a hardware device, a user initiated search query; analyzing, by the processor, results of the executing; generating, by the processor in response to results of the executing and the analyzing, a search results data set; detecting, by the processor enabling hardware sensor devices, how a user interacts with specific search facets of the search results data set; refining, by the processor based on results of the detecting, the search results data set; determining, by the processor, attributes of the specific search facets of the search results data set; and updating, by the processor based on results of the determining, unstructured data associated with items described within the search results data set.

A second aspect of the invention provides computer program product, comprising a computer readable hardware storage device storing a computer readable program code, the computer readable program code comprising an algorithm that when executed by a processor of a hardware device implements a domain specific search improvement method, the method comprising: executing, by the processor, a user initiated search query; analyzing, by the processor, results of the executing; generating, by the processor in response to results of the executing and the analyzing, a search results data set; detecting, by the processor enabling hardware sensor devices, how a user interacts with specific search facets of the search results data set; refining, by the processor based on results of the detecting, the search results data set; determining, by the processor, attributes of the specific search facets of the search results data set; and updating, by the processor based on results of the determining, unstructured data associated with items described within the search results data set.

A third aspect of the invention provides a hardware device comprising a processor coupled to a computer-readable memory unit, the memory unit comprising instructions that when executed by the processor executes a domain specific search improvement method comprising: executing, by the processor, a user initiated search query; analyzing, by the processor, results of the executing; generating, by the processor in response to results of the executing and the analyzing, a search results data set; detecting, by the processor enabling hardware sensor devices, how a user interacts with specific search facets of the search results data set; refining, by the processor based on results of the detecting, the search results data determining, by the processor, attributes of the specific search facets of the search results data set; and updating, by the processor based on results of the determining, unstructured data associated with items described within the search results data set.

The present invention advantageously provides a simple method and associated system capable of accurately executing a search.

DETAILED DESCRIPTION

Figure 1:
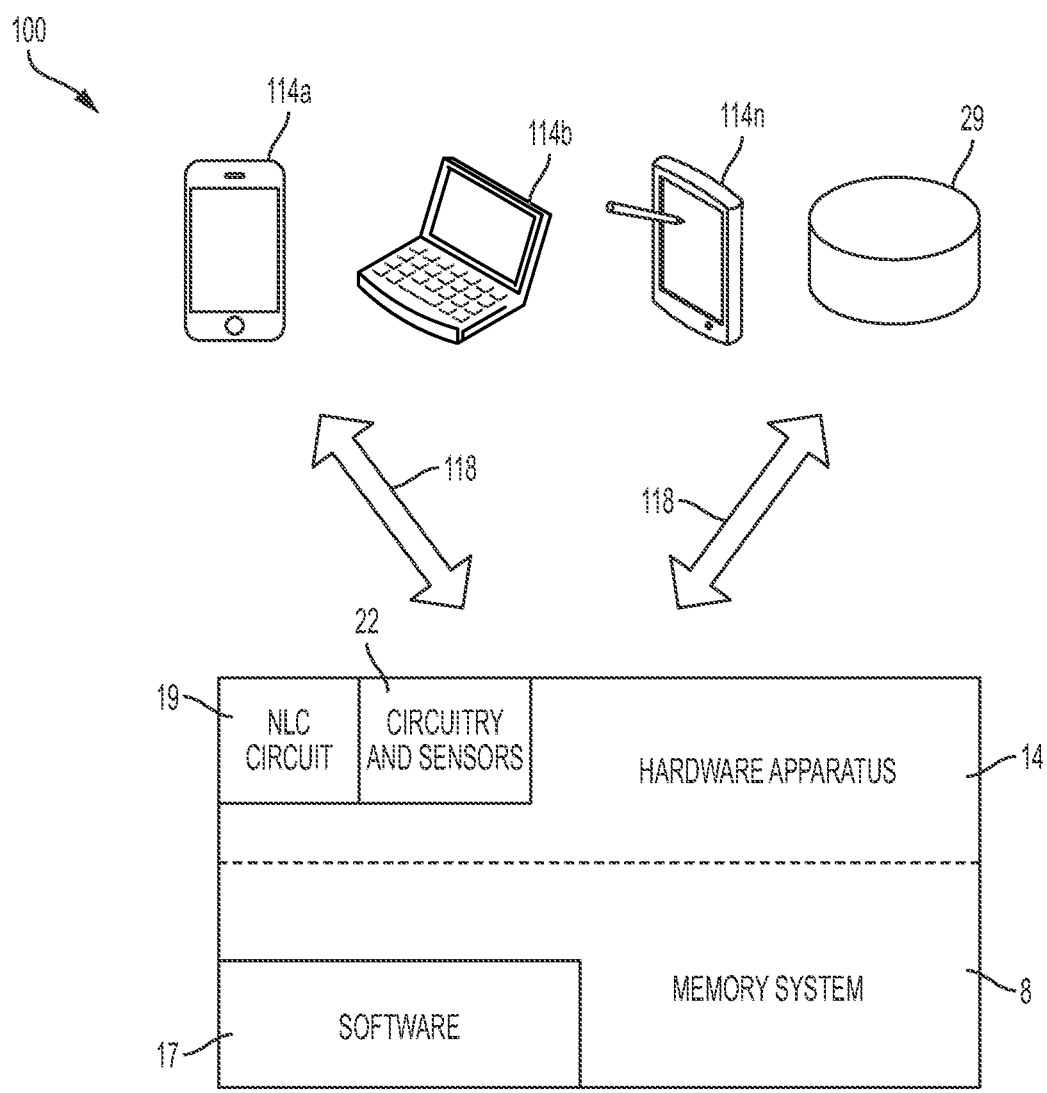
FIG. 1 illustrates a system for improving search query technology by determining how a user interacts with specific search facets of Web based search results and updating unstructured results of the Web based search results, in accordance with embodiments of the present invention.

FIG. 1 illustrates a system 100 for improving search query technology by determining how a user interacts with specific search facets of Web based search results and updating unstructured results of the Web based search results, in accordance with embodiments of the present invention. System 100 enables a process for determining a candidate set of unstructured Website based attributes for an item (e.g., a product). Archived user attribute interactions are analyzed to determine how often the unstructured Website based attributes have been referenced with respect to previous natural language searches. Attributes (of the unstructured Website based attributes) reaching a reference threshold are saved such that when a subsequent natural language search is executed, a superior result is achieved as only popular attributes (based on a popularity of use of the attributes in prior searches) are considered for the items. Therefore, system 100 executed a process for analyzing a history of user facet interaction (with items) via a natural language search to determine the most relevant attributes for an item. A facet is defined herein as a specific aspect or feature of an item. System 100 enables a natural language classifier (NLC) circuit 19 to execute a semantic search associated with an unstructured data analysis process with respect to search facet analysis. A semantic search improves a search accuracy by understanding user interactions in combination with a contextual meaning of terms as they appear within a searchable dataspace (e.g., the Internet, a closed system, etc.) to generate more relevant results.

System 100 of FIG. 1 includes hardware devices 114a . . . 114n and a user facet interaction data repository 29 in communication with a hardware apparatus 14 via a network 118. Hardware devices 114a . . . 114n and hardware apparatus 14 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, hardware devices 114a . . . 114n and hardware apparatus 14 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit such as a natural language classifier (NLC) circuit 19 and circuitry and sensors 22 designed for only implementing an automated process for determining how a user interacts with specific search facets of Web based search results and updating unstructured results of the Web based search results. Hardware apparatus 14 includes a memory system 8, software 17, NLC circuit 19, and circuitry and sensors 22. The memory system 8 (e.g., a database) and user facet interaction data repository 29 may each include a single memory system. Alternatively, the memory system 8 and user facet interaction data repository 29 may each include a plurality of memory systems. Hardware devices 114a . . . 114n may comprise any type of hardware devices (comprising embedded circuitry for only performing an automated process for determining how a user interacts with specific search facets of Web based search results and updating unstructured results of the Web based search results including, inter alia, a smart phone, a PDA, a tablet computer, a laptop computer, etc. Circuitry and sensors 22 may include any type of sensors including, inter alia, GPS sensors, video recording devices, optical sensors, weight sensors, temperature sensors, pressure sensors, etc. Additionally, Hardware devices 114a . . . 114n may comprise any of the aforementioned sensors for enabling an automated process for determining how a user interacts with specific search facets of Web based search results and updating unstructured results of the Web based search results.

System 100 of FIG. 1 enables a process for determining item attribute importance as follows:

During a process for executing a user initiated search query, a history associated with user facet interactions is determined based on previous natural language search queries and a history of user facet interactions. In response, an attribute for an item of a specified item category is determined. The attribute may be comprised by a description of the item and may be identified as being above a threshold number of instances with respect to descriptions of products included within the a specified item category. One or more facets for a category of items may be determined based the attribute. A set of search results for the specified item category is presented to a user. The set of search results for the specified item category is refined based an item facet selection. The description of the item includes structured data and one or more unstructured data/value pair attributes may be generated from the structured data.

Figure 2:
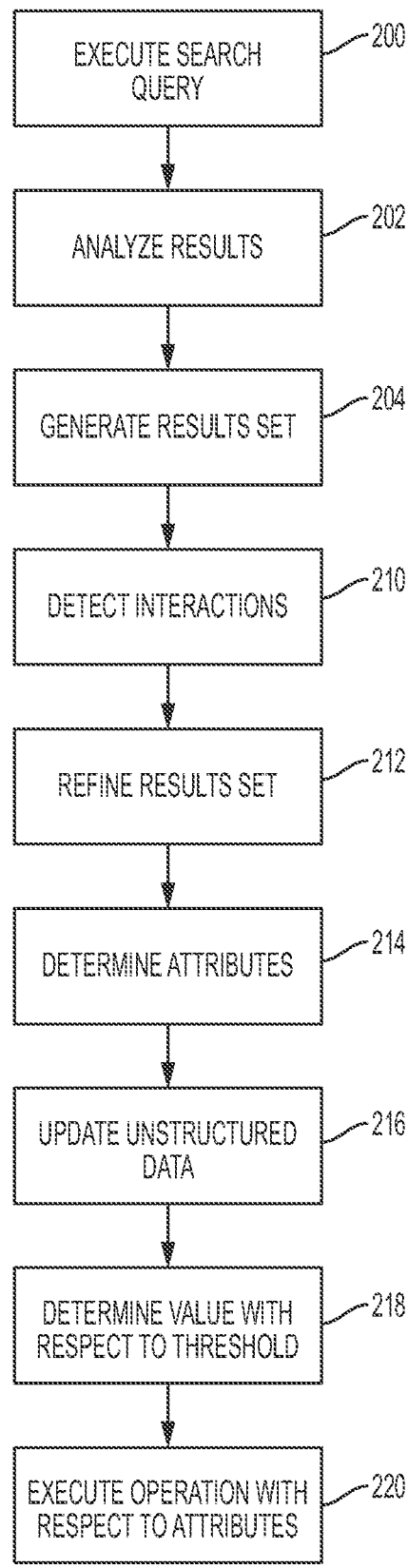
FIG. 2 illustrates an algorithm detailing a process flow enabled by the system of FIG. 1 for improving search query technology by determining how a user interacts with specific search facets of Web based search results and updating unstructured results of the Web based search results, in accordance with embodiments of the present invention.

FIG. 2 illustrates an algorithm detailing a process flow enabled by system 100 of FIG. 1 for improving search query technology by determining how a user interacts with specific search facets of Web based search results and updating unstructured results of the Web based search results, in accordance with embodiments of the present invention. Each of the steps in the algorithm of FIG. 2 may be enabled and executed in any order by a computer processor(s) or any type of specialized hardware executing specialized computer code. In step 200, a user initiated search query is executed. In step 202, the results of the user initiated search query are analyzed (e.g., via execution of a keyword extraction process). In step 204, a search results data set is generated based on results of steps 200 and 202. In step 210, system 100 detects (via sensors) how a user interacts with specific search facets of the search results data set. In step 212, the search results data set is refined based on results of step 210. In step 214, attributes of said specific search facets of the search results data set are determined. In step 216, unstructured data associated with items described within the search results data set are updated based on results of step 214. The update may include, inter alia, retaining data of the unstructured data, removing data of the unstructured data, etc. In step 218, a value associated with a number of times that the search facet attributes have been selected in search results data set executed by additional users is determined. Additionally, system 100 determines if the value exceeds or is less than a specified threshold value. In step 220, the attributes are: combined with associated unstructured data (if the specified threshold value exceeds the specified threshold value) or removed from the associated unstructured data (if the specified threshold value is less than the specified threshold value). The associated unstructured data may include natural language pairs and associated attributes.

Figure 3:
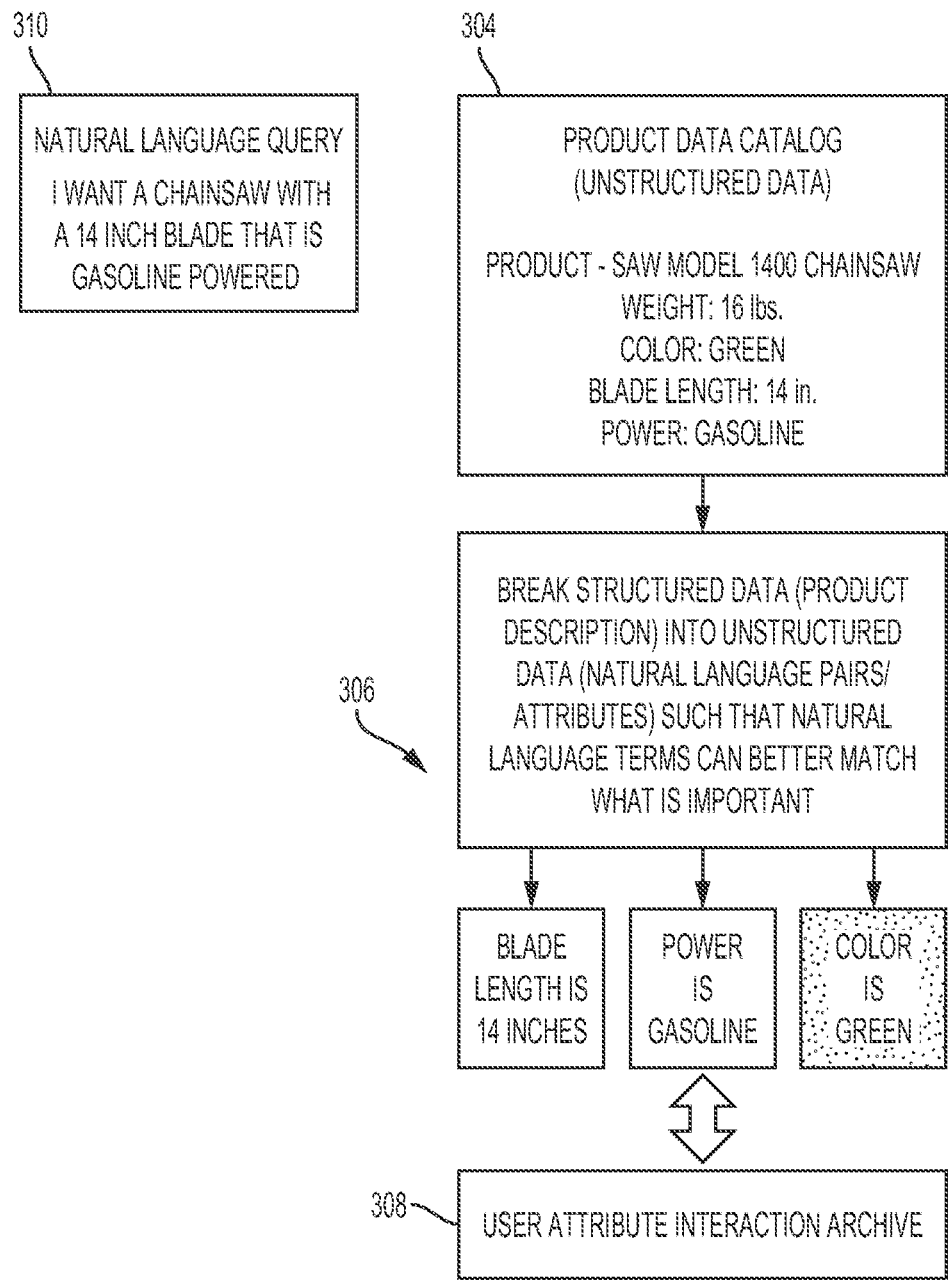
FIG. 3 illustrates an implementation example enabled by the system of FIG. 1 for improving search query technology by determining how a user interacts with specific search facets of Web based search results and updating unstructured results of the Web based search results, in accordance with embodiments of the present invention.

FIG. 3 illustrates an implementation example enabled by system 100 of FIG. 1 for improving search query technology by determining how a user interacts with specific search facets of Web based search results and updating unstructured results of the Web based search results, in accordance with embodiments of the present invention. System 100 enables a process for modifying a corpus (i.e., a large collection of data text such as written or spoken material upon which a linguistic analysis is based) of data related to a set of items (e.g., products, services, digital goods or services, electronic information, etc.) based on user interaction with associated facets. The example illustrates a product data catalog 304 (retrieved during a natural language query 310) comprising a search entry for the term "chainsaw" (i.e., Saw Model 1440). In response, a list of chain saws is returned in combination with a set of associated facets. A product description for the chainsaw item comprises structured data. Therefore, the system (e.g., system 100 of FIG. 1) generates related unstructured data/value pair attributes 306 from the structured data. For example: a blade length comprises 14 inches; power is provided by gasoline; and the color is green. In response, the system maintains an archive of user attribute interactions with respect to a Website associated with previous user searches. For example, in multiple prior natural language searches for chainsaws at the Website, users associated attributes of "blade length" and "power" very frequently with chainsaws, but rarely, associated an attribute of "color" with a chainsaw search. Therefore, attributes of "blade length" and "power" are flagged as relevant facets for the Web search and stored in a user attribute interaction archive 308. Likewise, an attribute of "power" is not determined to be a relevant facet for the search.

Additionally, a Webpage illustrating multiple searched products may present multiple possible facets that may be refined by, inter alia, a brand, a power source, a chain saw chain length, a color, etc. In response, users may interact with the facets to refine the search results. Based on the interactions it is determined that a majority of users typically refine or interact with the facets of: power source, brand, and chain saw length and rarely refine or interact with the facets of color. Therefore, a resulting corpus is created or modified (i.e., with respect to facet interaction changes over time) using natural language attributes. For example, a specific chain saw may comprise a corpus of: "Brand is Remington. Chain length is 20 inches. Power source is gasoline. Price is $25. Color is green. Weight is 6.2 lbs. Warranty is 5 years". System 100 monitors user interactions and determines that the top facets are: Brand, Chain length, and Price. Additionally, system 100 determines the facets of: Color and Weight do not typically comprise facets associated with user interactions. Therefore, overtime as the aforementioned facet interactions change, a natural language corpus entry may additionally change based on a computer hardware/software based self-learning process and in response, the entries of: "color is green" "weight is 6.2 lbs." are removed from search results thereby improving a search time and accuracy resulting in an improved (i.e., faster) search process based on the refined (i.e., smaller and more specific) corpus content. The improved corpus content prevents hardware apparatus 14 (of FIG. 1) from evaluating a large amount of irrelevant information. Therefore, based on tailoring process with respect to the facets, superior search results may be presented to the user. For example, a speed at which system 100 (hardware apparatus 14) is able to locate information is significantly faster when only relevant information is available within the corpus. Likewise, system 100 is enabled (via a training or iterative learning process) such that hardware and software of the system is improved over time via a process to determine information relevant to different types of products/items/searches such that a hardware and software functionality is improved thereby improving an operation of hardware apparatus 14 of FIG. 1.

Figure 4:
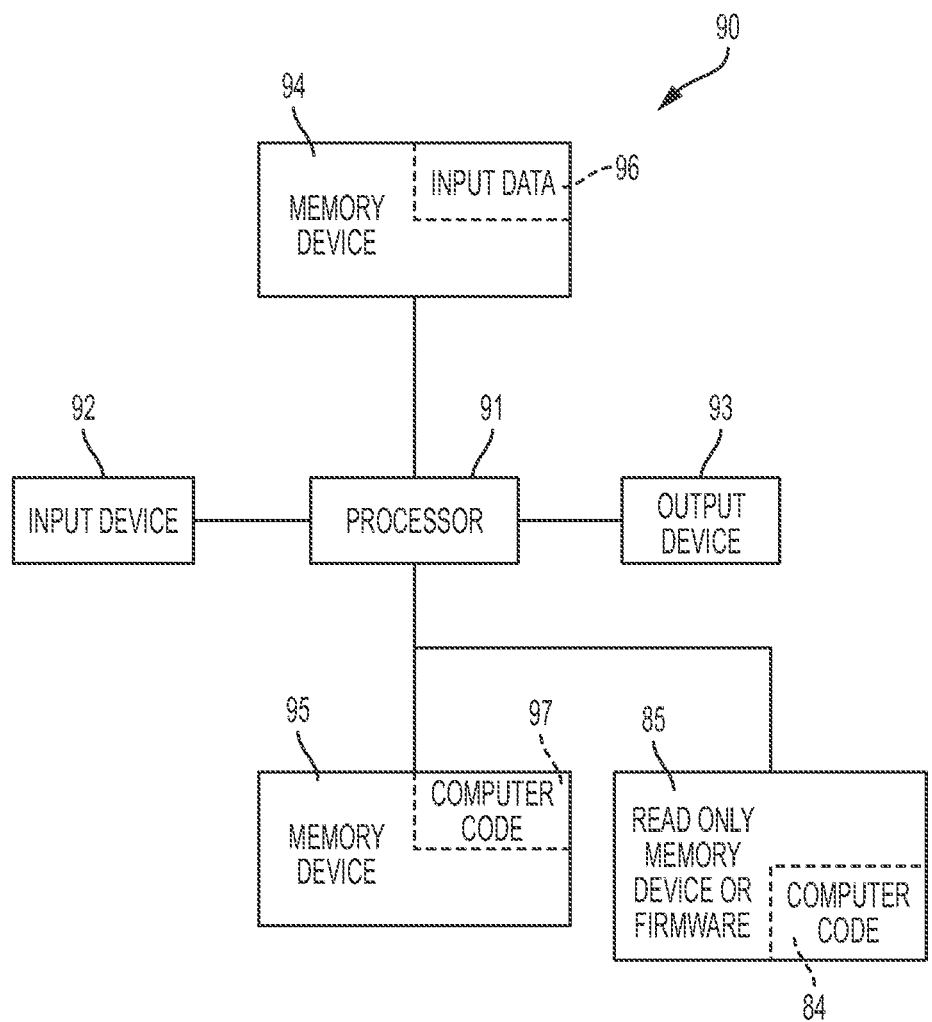
FIG. 4 illustrates a computer system used by the system of FIG. 1 for enabling a process for improving search query technology by determining how a user interacts with specific search facets of Web based search results and updating unstructured results of the Web based search results, in accordance with embodiments of the present invention.

FIG. 4 illustrates a computer system 90 (e.g., hardware devices 114a . . . 114n and hardware apparatus 14) used by or comprised by the system of FIG. 1 for improving search query technology by determining how a user interacts with specific search facets of Web based search results and updating unstructured results of the Web based search results, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for enabling a process for improving search query technology by determining how a user interacts with specific search facets of Web based search results and updating unstructured results of the Web based search results. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to enable a process for improving search query technology by determining how a user interacts with specific search facets of Web based search results and updating unstructured results of the Web based search results. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving search query technology by determining how a user interacts with specific search facets of Web based search results and updating unstructured results of the Web based search results. In another embodiment, the invention provides a business method that performs the process steps of the invention on a subscription, advertising, and/or fee basis. That is, a service supplier, such as a Solution Integrator, could offer to enable a process for improving search query technology by determining how a user interacts with specific search facets of Web based search results and updating unstructured results of the Web based search results. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
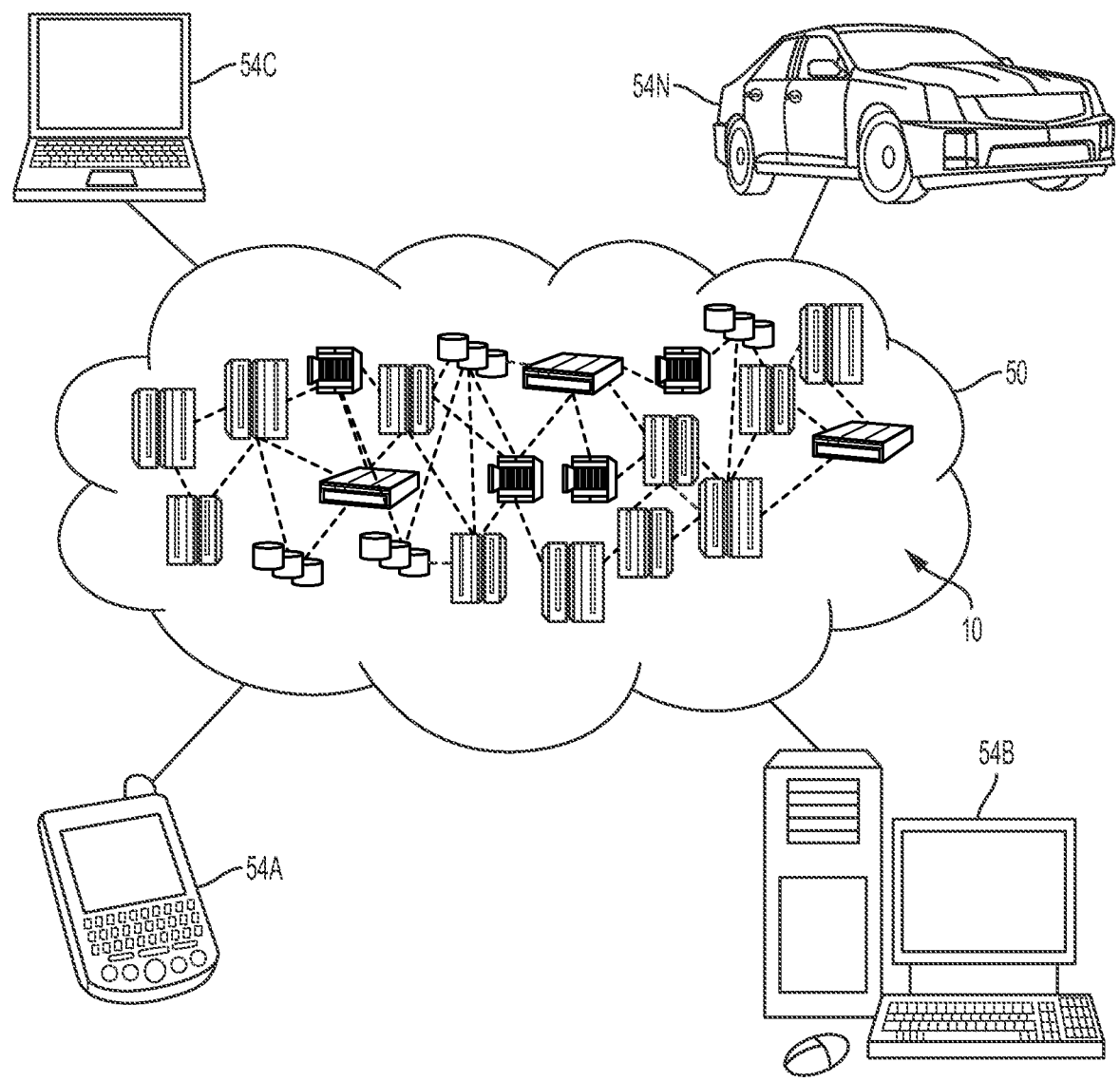
FIG. 5 illustrates a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 6:
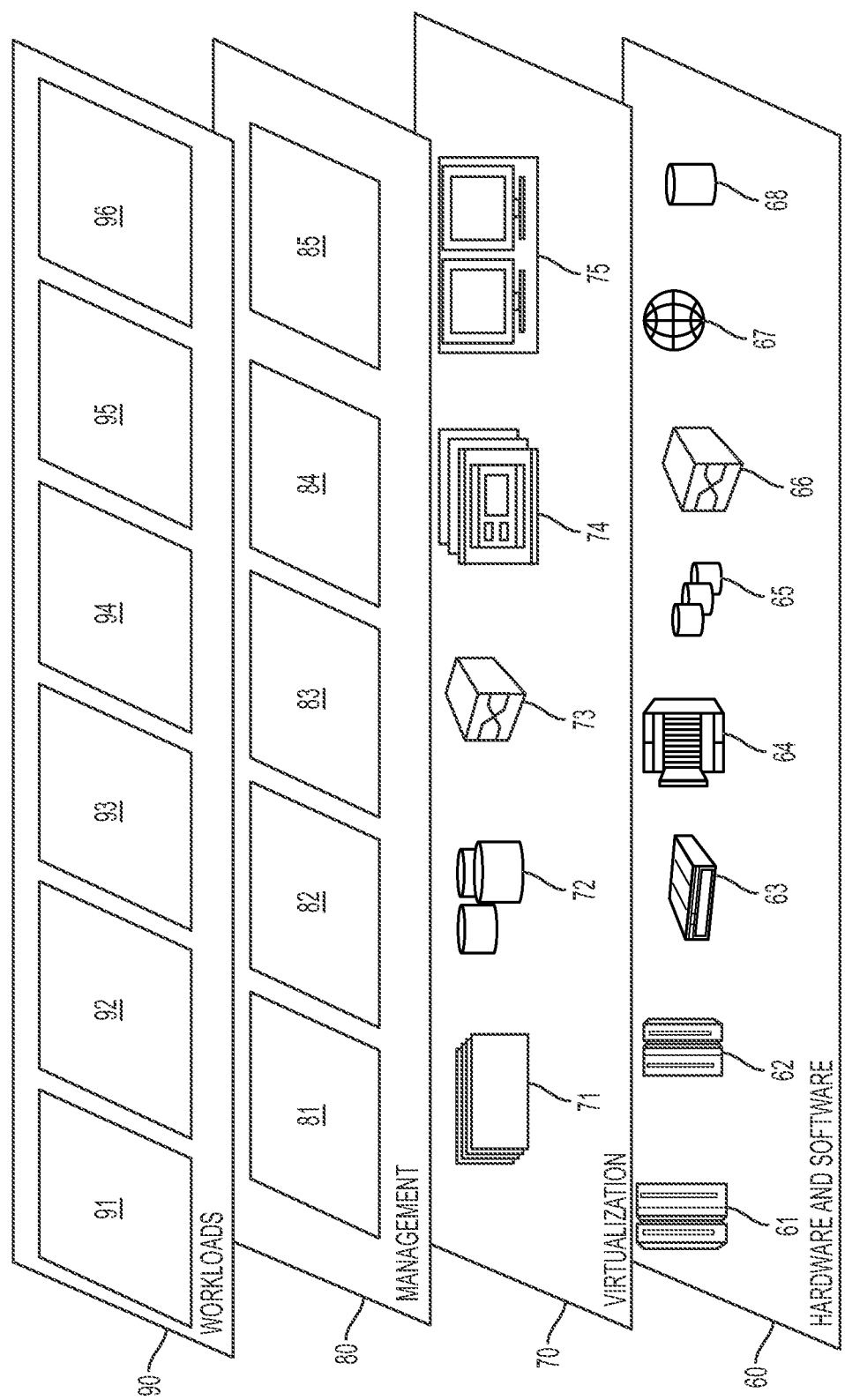
FIG. 6 illustrates a set of functional abstraction layers provided by the cloud computing environment, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving search query technology by determining how a user interacts with specific search facets of Web based search results and updating unstructured results of the Web based search results.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A domain specific search method comprising:
executing, by a processor of a special purpose hardware device, a user initiated search query, wherein said special purpose hardware device comprises electronic circuitry comprising a programmable logic array utilizing state information of specialized firmware program code configured to execute specialized software for personalizing said electronic circuitry for performing said domain specific search method;
receiving, by said processor, an archive of user attribute interactions executed with respect to a Website associated with previous user searches;
determining, by said processor in response to analyzing results of said executing said user initiated search query and said receiving said archive, a contextual meaning of terms of said user initiated search;
generating, by said processor in response to results of said executing and said analyzing results and said contextual meaning of said terms, a search results data set;
detecting, by said processor enabling hardware sensor devices of said special purpose hardware device, how a user interacts with specific search facets of said search results data set,
wherein said hardware sensor devices comprise video recording devices, optical sensors, and pressure sensors;
determining, by said processor, attributes of said specific search facets of said search results data set, wherein said attributes are comprised by a description of an item of said search results data set;
identifying, by said processor, said attributes as exceeding a threshold number of instances with respect to descriptions of products included within a specified item category;
updating, by said processor based on results of said determining and said identifying, structured data associated with items described within said search results data set thereby improving a speed of a search time and accuracy of said domain specific search method resulting in an improvement in search query technology based on refined corpus content, generated based on linguistic analysis, of said structured data for preventing special purpose hardware device from evaluating a large amount of irrelevant information thereby enabling a user to locate a specific product comprising relevant facets associated with needs of said user, wherein said updating comprises removing data of said structured data;
generating, by said processor based on results of said updating, unstructured data value pair attributes from said structured data; and
executing, by said processor, an iterative hardware and software based self learning process such that hardware and software of said special purpose hardware device is improved over time by determining information relevant to different types of products, items, and searches such that a hardware and software functionality of said special purpose hardware device is improved thereby improving an operation of said special purpose hardware device.

2. The method of claim 1, further comprising:
determining, by said processor, a value associated with a number of times that said search facet attributes have been selected in search results data set executed by additional users.

3. The method of claim 2, further comprising:
additionally determining, by said processor, that said value exceeds a specified threshold; and
combining, by said processor based on results of said additionally determining that said value exceeds said specified threshold, said attributes with said structured data.

4. The method of claim 2, further comprising:
additionally determining, by said processor, that said value is less than a specified threshold; and removing, by said processor based on results of said additionally determining that said value is less than said specified threshold, said attributes from said structured data.

5. The method of claim 1, wherein said analyzing results comprises executing a keyword extraction process.

6. The method of claim 1, wherein said updating further comprises retaining data of said structured data.

7. The method of claim 1, further comprising:
providing at least one support service for at least one of creating, integrating, hosting, maintaining, and deploying computer-readable code in the hardware device, said code being executed by the computer processor to implement: said executing, said generating, said detecting, said determining, and said updating.

8. A computer program product, comprising a computer readable hardware storage device storing a computer readable program code, said computer readable program code comprising an algorithm that when executed by a processor of a special purpose hardware device implements a domain specific search improvement method, said method comprising:

executing, by said processor, a user initiated search query, wherein said special purpose hardware device comprises electronic circuitry comprising a programmable logic array utilizing state information of specialized firmware program code configured to execute specialized software for personalizing said electronic circuitry for performing said domain specific search method;

receiving, by said processor, an archive of user attribute interactions executed with respect to a Website associated with previous user searches;

determining, by said processor in response to analyzing results of said executing said user initiated search query and said receiving said archive, a contextual meaning of terms of said user initiated search;

generating, by said processor in response to results of said executing and said analyzing results and said contextual meaning of said terms, a search results data set;

detecting, by said processor enabling hardware sensor devices of said special purpose hardware device, how a user interacts with specific search facets of said search results data set, wherein said hardware sensor devices comprise video recording devices, optical sensors, and pressure sensors;

determining, by said processor, attributes of said specific search facets of said search results data set, wherein said attributes are comprised by a description of an item of said search results data set;

identifying, by said processor, said attributes as exceeding a threshold number of instances with respect to descriptions of products included within a specified item category;

updating, by said processor based on results of said determining and said identifying, structured data associated with items described within said search results data set thereby improving a speed of a search time and accuracy of said domain specific search method resulting in an improvement in search query technology based on refined corpus content, generated based on linguistic analysis, of said structured data for preventing special purpose hardware device from evaluating a large amount of irrelevant information thereby enabling a user to locate a specific product comprising relevant facets associated with needs of said user, wherein said updating comprises removing data of said structured data;

generating, by said processor based on results of said updating, unstructured data value pair attributes from said structured data; and executing, by said processor, an iterative hardware and software based self learning process such that hardware and software of said special purpose hardware device is improved over time by determining information relevant to different types of products, items, and searches such that a hardware and software functionality of said special purpose hardware device is improved thereby improving an operation of said special purpose hardware device.

9. The computer program product of claim 8, wherein said method further comprises:
determining, by said processor, a value associated with a number of times that said search facet attributes have been selected in search results data set executed by additional users.

10. The computer program product of claim 9, wherein said method further comprises:
additionally determining, by said processor, that said value exceeds a specified threshold; and
combining, by said processor based on results of said additionally determining that said value exceeds said specified threshold, said attributes with said structured data.

11. The computer program product of claim 9, wherein said method further comprises:
additionally determining, by said processor, that said value is less than a specified threshold; and
removing, by said processor based on results of said additionally determining that said value is less than said specified threshold, said attributes from said structured data.

12. The computer program product of claim 8, wherein said analyzing results comprises executing a keyword extraction process.

13. The computer program product of claim 8, wherein said updating comprises removing data of said structured data.

14. A hardware device comprising a processor coupled to a computer-readable memory unit, said memory unit comprising instructions that when executed by the processor executes a domain specific search improvement method comprising:

executing, by said processor, a user initiated search query, wherein said special purpose hardware device comprises electronic circuitry comprising a programmable logic array utilizing state information of specialized firmware program code configured to execute specialized software for personalizing said electronic circuitry for performing said domain specific search method;

receiving, by said processor, an archive of user attribute interactions executed with respect to a Website associated with previous user searches;

determining, by said processor in response to analyzing results of said executing said user initiated search query and said receiving said archive, a contextual meaning of terms of said user initiated search;

generating, by said processor in response to results of said executing and said analyzing results and said contextual meaning of said terms, a search results data set;

detecting, by said processor enabling hardware sensor devices of said special purpose hardware device, how a user interacts with specific search facets of said search results data set, wherein said hardware sensor devices comprise video recording devices, optical sensors, and pressure sensors;

determining, by said processor, attributes of said specific search facets of said search results data set, wherein said attributes are comprised by a description of an item of said search results data set;

identifying, by said processor, said attributes as exceeding a threshold number of instances with respect to descriptions of products included within a specified item category;

updating, by said processor based on results of said determining and said identifying, structured data associated with items described within said search results data set thereby improving a speed of a search time and accuracy of said domain specific search method resulting in an improvement in search query technology based on refined corpus content, generated based on linguistic analysis, of said structured data for preventing special purpose hardware device from evaluating a large amount of irrelevant information thereby enabling a user to locate a specific product comprising relevant facets associated with needs of said user, wherein said updating comprises removing data of said structured data;

generating, by said processor based on results of said updating, unstructured data value pair attributes from said structured data; and executing, by said processor, an iterative hardware and software based self learning process such that hardware and software of said special purpose hardware device is improved over time by determining information relevant to different types of products, items, and searches such that a hardware and software functionality of said special purpose hardware device is improved thereby improving an operation of said special purpose hardware device.

15. The hardware device of claim 14, wherein said method further comprises:

determining, by said processor, a value associated with a number of times that said search facet attributes have been selected in search results data set executed by additional users.

16. The hardware device of claim 15, wherein said method further comprises:

additionally determining, by said processor, that said value exceeds a specified threshold; and combining, by said processor based on results of said additionally determining that said value exceeds said specified threshold, said attributes with said structured data.

17. The hardware device of claim 15, wherein said method further comprises:

additionally determining, by said processor, that said value is less than a specified threshold; and removing, by said processor based on results of said additionally determining that said value is less than said specified threshold, said attributes from said structured data.

18. The computer program product of claim 14, wherein said analyzing results comprises executing a keyword extraction process.

19. The computer program product of claim 14, wherein said updating comprises removing data of said structured data.

* * * * *